(12) United States Patent
Petersen

(10) Patent No.: US 6,227,065 B1
(45) Date of Patent: May 8, 2001

(54) RACK AND PINION HAVING AN END STOP AND AN OVERLOAD PROTECTOR

(75) Inventor: Pelle Normann Petersen, Jelling (DK)

(73) Assignee: INTERLEGO AG, Baar (CH)

( * ) Notice: Subject to any disclaimer, the term of this patent is extended or adjusted under 35 U.S.C. 154(b) by 0 days.

(21) Appl. No.: 09/415,618

(22) Filed: Oct. 12, 1999

(30) Foreign Application Priority Data

Oct. 14, 1998 (DK) .............................. 1998 01308

(51) Int. Cl.[7] .............................. F16H 1/04; F16C 33/02; A63H 17/36
(52) U.S. Cl. .......................... 74/422; 74/89.17; 74/89.18; 74/410; 384/295; 446/460
(58) Field of Search ................. 74/89.17, 89.18, 74/410, 422; 384/295; 446/120, 430, 460

(56) References Cited

U.S. PATENT DOCUMENTS

| | | |
|---|---|---|
| 4,130,024 | 12/1978 | Hayasaka et al. . |
| 4,270,397 * | 6/1981 | Adams .............................. 74/422 X |
| 4,397,199 * | 8/1983 | Jahn ........................................ 74/422 |
| 4,516,663 * | 5/1985 | D'Alessio et al. .................. 74/422 X |
| 4,669,328 * | 6/1987 | Kishi et al. ............................. 74/422 |
| 5,281,184 * | 1/1994 | Siumon ................................ 446/460 |
| 5,522,752 * | 6/1996 | Liu .................................. 446/430 X |
| 5,528,946 | 6/1996 | Yadegar . |
| 5,582,070 * | 12/1996 | Dominguez ........................ 74/422 X |
| 5,919,072 * | 7/1999 | Pohlman .............................. 446/120 |
| 5,924,910 * | 7/1999 | Liu .................................. 446/460 X |

FOREIGN PATENT DOCUMENTS

| | | |
|---|---|---|
| 0 102 511 A1 | 3/1984 | (EP) . |
| 0 410 936 A1 | 1/1991 | (EP) . |
| 2 001 409 | 1/1979 | (UA) . |
| 2 252 055 | 7/1992 | (UA) . |

* cited by examiner

Primary Examiner—David Fenstermacher
Assistant Examiner—Colby Hansen
(74) Attorney, Agent, or Firm—Pitney, Hardin, Kipp & Szuch LLP

(57) ABSTRACT

A rack and pinion with a rack (20) and a gear wheel (30) in operative engagement with each other, whereby movement of the rack (20) causes rotation of the gear wheel (30) and vice versa, and wherein an end stop is provided in the form of there being after the outermost gap (25) between teeth (21) at the end of the row of teeth (21) of the rack, instead of a gap, a "filled" gap or a plateau (26) which prevents a tooth (31b) on the gear wheel from getting into engagement. The bearing (11) of the gear wheel allows movement of the gear wheel relative to the rack in a direction transversely to the longitudinal direction of the rack, and by movement beyond the end stop the gear wheel will be pressed out of its bearing, and the mechanism is thereby protected against overloading.

4 Claims, 2 Drawing Sheets

RACK AND PINION HAVING AN END STOP AND AN OVERLOAD PROTECTOR

The invention relates to a rack and pinion having a rack and a pinion or gear wheel in operative engagement with each other, whereby movement of the rack causes rotation of the gear wheel or vice versa, and wherein an end stop is provided in the form of there being after the outermost gap at the end of the row of teeth of the rack, instead of a gap, a "filled" gap which prevents a tooth of the gear wheel from getting into engagement.

Such a rack and pinion is known e.g. from EP 410 936. Used in toys, it is expedient that a rack and pinion has an end stop, thereby ensuring that the parts of the rack and pinion cannot be separated unintentionally. Toys are frequently made of plastics, and in case of a great impact on the rack at its end stop position there will be a risk of overloading of the mechanism, causing damage in the form of breaks or permanent deformation.

With the invention, the gear wheel is mounted such that it can move relative to the rack in a direction transversely to the longitudinal direction of the rack. An overload protection is provided hereby, by means of which such unfortunate consequences are avoided. In the event that the rack is forced past one of its end stops, the gear wheel will yield laterally and be disengaged from the rack, without any of the parts being overloaded. The user can then easily put rack and gear wheel into position again, thereby re-establishing the full function of the mechanism.

Figure 1:
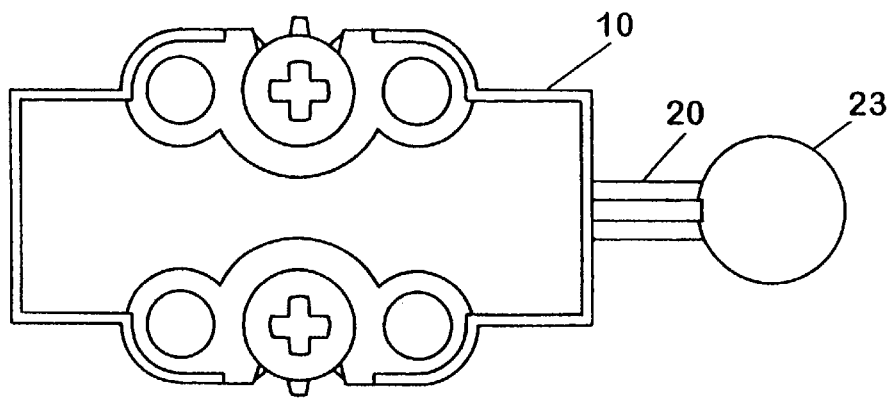
Figure 2:
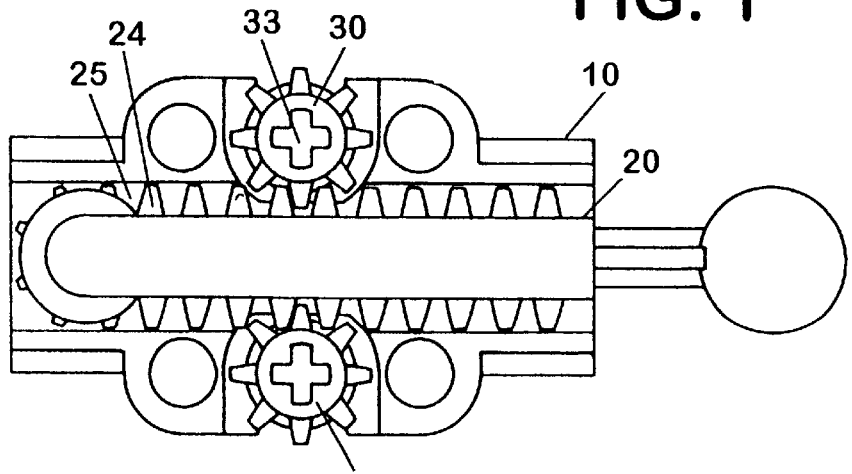
Figure 3:
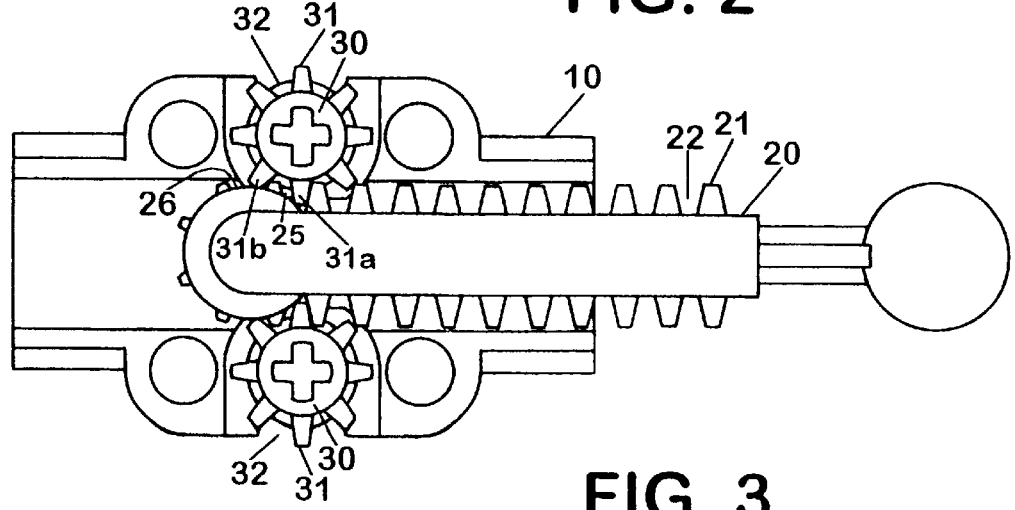
Figure 4:
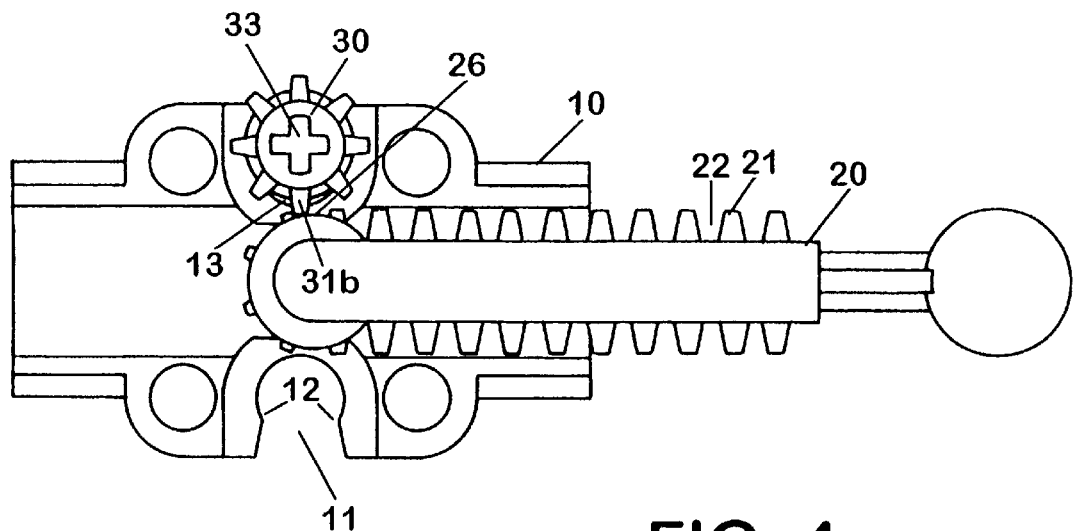
Figure 5:
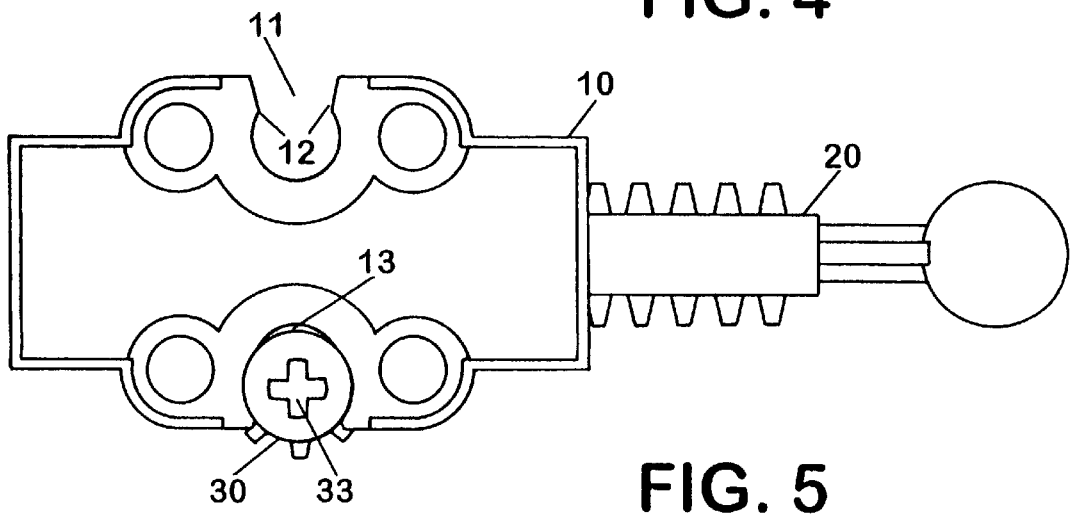
Figure 6:
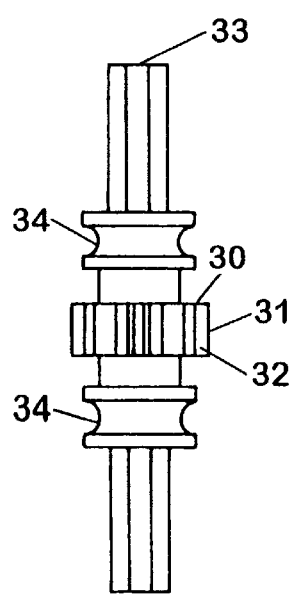

A preferred embodiment of the invention will be described below with reference to the drawings, in which FIG. 1 shows a rack and pinion, FIG. 2 shows the interior of the rack and pinion of FIG. 1, FIG. 3 shows the interior of the rack and pinion of FIG. 1 with the rack in an end stop position, FIG. 4 shows the interior of the rack and pinion with the overload protection in function, FIG. 5 shows the rack and pinion of FIG. 4 seen from the outside, and FIG. 6 shows a gear wheel mounted on a shaft for use in the rack and pinion.

FIGS. 1–5 show a rack and pinion with a housing 10 which accommodates a rack 20 and one or two gear wheels 30. The housing 10 is made of plastics. On two of its opposite sides the rack 20 has a row of uniform teeth 21 with uniform depressions or gaps 22 between the teeth. At its one end the rack 20 has a ball-shaped part 23 which serves as a handle for a user. At the opposite end the row of teeth of the rack has an outermost tooth 24 and an outermost gap or depression 25. The gear wheels 30 are of a known type with a rim of uniform, radially protruding teeth 31 with uniform depressions or gaps 32 between the teeth. The rack 20 is mounted in the housing 10 so as to be movable in its longitudinal direction, and the gear wheels 30 are mounted on a shaft 33 and are arranged in the housing 10 so as to be rotatable about the shaft 33.

The rack 20 and the gear wheels 30 are in operative engagement with each other in a known manner, as the teeth 31 of the rack may be in mesh with the teeth 31 of the gear wheels. The movements of the rack and the gear wheels are hereby associated with each other, and when a user moves the rack in its longitudinal direction by means of the handle 23, the gear wheels will be rotated because of the operative engagement between the rack and the gear wheels, and if one of the gear wheels is rotated, this rotation will cause the rack to be moved.

In FIG. 3, the rack is shown in an outer position in which a tooth 31a is in engagement in the outer gap or depression 25, while the adjacent tooth 31b is in contact with an end area 26 on the rack. The end area 26 has a height which is so much higher than the bottom of the gaps 22 between the teeth 21 that the tooth 31b of the gear wheel hits the end area, whereby further rotation of the gear wheel 30 is blocked, just as the rack is blocked for further movement. The elevated end area 26 hereby serves as an end stop.

In FIGS. 4–5 the one gear wheel with shaft is removed. On two opposite sides of the shown walls the housing 10 has U-shaped incisions 11 which serve as bearings for the gear wheels 30 and their shafts 33. The incisions 11 have openings which face away from the rack 20, and between the opening and the bottom the sides of the incisions have projections 12 which define a constriction of the incisions 11. When the rack and pinion is to be assembled, the rack 20 is first inserted into the housing 10, and then the gear wheels 30 on the shafts 33 are mounted in their respective ones of the incisions 11. It will be seen in FIG. 6 that the shaft 33 has a constriction 34 on both sides of the gear wheel 30, and upon assembly these constrictions will receive the opposite edges of the walls, and upon passage of the projections 12 the housing will be deformed because of the elasticity of the plastics material precisely as much as allows the shaft to be pressed down to the bottom of the U-shaped incision 11 by snap action. The shafts may be taken out of the incisions 11 in a corresponding manner by an opposite snap action.

In FIG. 4, the rack 20 is pulled further out than to the end stop as shown in FIG. 3. Hereby, the elevated end area 26 applies pressure to the tip of the tooth 31b on the gear wheel as shown in FIG. 3, and by further pulling of the rack the gear wheel 30 will rotate to the position which is shown in FIGS. 4 and 5, in which the gear wheel 30 with its shaft is pressed a distance out of the U-shaped incision, which will be seen clearly, as a gap 13 has hereby been created between the gear wheel and the bottom of the incision 11.

This structure thus protects against overloading, as, when exceeding the end stop, the gear wheel with its shaft is merely pushed out of its bearing and out of its operative engagement with the rack. When the rack and pinion is to be used again, the rack is first pushed into the housing and at least to the end stop position in FIG. 3, following which the gear wheels with their shafts, as described above, are again snapped into place in the position in the incisions which is shown in FIGS. 1–3.

The protection against loading is described here with movement of the rack as the driving movement, but it works in a corresponding manner with rotation of one of the gear wheels as the driving movement, as this too will cause the gear wheels to be pressed out of the bearings.

What is claimed is:

1. A rack and pinion comprising a housing (10), a rack (20) with at least a row of uniform depressions (22) in the surface, thereby defining a row of uniform teeth (21) between pairs of depressions (22), means for mounting the rack (10) in the housing (10) so that the rack (20) may be moved in its longitudinal direction, a gear wheel (30) with a row of uniform depressions (32) in the surface, thereby defining a rim of uniform teeth (31) between pairs of depressions, means (11) for mounting the gear wheel (30) in the housing (10) so that the gear wheel (30) may rotate, such that the row of depressions (22) and teeth (21) of the rack (20) are in operative engagement with the depressions

(32) and teeth (31) of the gear wheel (30), whereby movement of the rack (20) causes rotation of the gear wheel (30) and vice versa, and wherein one of the row of depressions (22) at an end of this row has an outermost depression (25), whereby engagement of a tooth (31) beyond this outermost depression (25) is prevented, thereby defining an end stop for the mutual movement of the rack (20) and the gear wheel (30), characterized in that the rack and pinion are protected against overloading at its end stops in that the bearing (11, 12) of the gear wheel (30) allows movement of the gear wheel (30) relative to the rack (20) in a direction transversely to the longitudinal direction of the rack (20).

2. A rack and pinion according to claim 1, characterized in that the gear wheel (30) is mounted on a shaft (33), and that the housing (10) has a U-shaped incision (11) which has its opening facing away from the rack (20), and in which the shaft (33) of the gear wheel is mounted.

3. A rack and pinion according to claim 2, characterized in that the U-shaped incision (11) has a constriction (12) to secure the shaft (30) of the gear wheel at the bottom of the incision (11).

4. A rack and pinion according to claim 3, characterized in that the housing (10) is made of an elastic material which allows the shaft (33) of the gear wheel to pass the constriction (12) by snap action.

\* \* \* \* \*